United States Patent [19]

Van Schaack

[11] Patent Number: 4,928,393
[45] Date of Patent: May 29, 1990

[54] LANE MARKER STEERING GUIDE

[76] Inventor: Wilbur B. Van Schaack, 4215 25th St. West, Bradenton, Fla. 33505

[21] Appl. No.: 340,912

[22] Filed: Apr. 20, 1989

Related U.S. Application Data

[63] Continuation of Ser. No. 152,971, Feb. 8, 1988, Pat. No. 4,823,471.

[51] Int. Cl.⁵ .............................................. G01C 21/04
[52] U.S. Cl. ...................................................... 33/264
[58] Field of Search ...................... 33/264; 248/206.3; 116/28 R

[56] References Cited

U.S. PATENT DOCUMENTS

| | | | |
|---|---|---|---|
| 647,123 | 4/1900 | Warner | 33/233 |
| 1,872,532 | 8/1932 | Kenna | 33/264 |
| 2,584,777 | 2/1952 | Adolfson | 33/264 |
| 3,834,036 | 9/1974 | Scarritt | 33/264 |

*Primary Examiner*—Harry N. Haroian
*Attorney, Agent, or Firm*—Charles J. Prescott

[57] ABSTRACT

A lane marker steering guide attachable in close proximity to the surface of the windshield of a vehicle or its dash panel including a single sight member connected to means for attaching the steering guide to the inner surface of the windshield or its dash panel. The upper portion of the sight member is arrow-shaped and upwardly pointing when installed and includes an opaque or translucent layer on the upper portion of the otherwise transparent sighting member. The attaching means is also preferably substantially transparent. Both sight member and attaching means have various embodiments, including lateral and vertical adjusting means for the sight member. However, an important feature of this invention resides in its close proximity, particularly the sight member, to the inner surface of the windshield to reduce reflective glare. To achieve this close proximity of sight member to windshield, all of the embodiments of the invention provide structure which enhances this close proximity, including one embodiment which provides a thin flexible sight member held in spring biased fashion against the inner surface of the windshield.

2 Claims, 2 Drawing Sheets

LANE MARKER STEERING GUIDE

This is a continuation of co-pending application Ser. No. 07/152,971 filed on Feb. 8, 1988 now U.S. Pat. No. 4,823,471.

BACKGROUND OF THE INVENTION

This invention relates generally to vehicle guidance devices, and more particularly to steering guide devices for maintaining a vehicle within the marked lane on a roadway.

Prior art discloses a number of such devices for vehicles, particularly automobiles, which are, perhaps, functionally adequate in a cumbersome manner, but which also include superfluous structure in relation to the present invention. One such device is disclosed in U.S. Pat. No. 1,610,477 to Sanford directed to a circular device having an aperture therethrough for viewing in conjunction with the center hood ornament of the vehicle. The accessory device disclosed in U.S. Pat. No. 2,046,581 to Reeves teaches a driving and parking guide having complex structure enabling the invention to be attached to the older style automobile radiator caps at the front center of the hood of the vehicle. The vehicle guide disclosed in U.S. Pat. No. 3,199,487 to Heinkel is directed to a pair of elongated wires disposed in triangular fashion one to another, each having a moveable spherically shaped sight member to be utilized, apparently, as is a two-part rifle sight. This invention is particularly cumbersome in that substantial amounts of apparatus are placed in full view of, and contact by, the operator of the vehicle.

The lane strips steering guide disclosed in U.S. Pat. No. 3,834,036 to Scarritt discloses dual opposing visual guides carefully positioned on the forward part of the vehicle or windshield which, used simultaneously, apparently provide visual indicia with respect to the lateral positioning of the vehicle within the parallel painted lane strips on each edge of the lane. Additionally, with respect to the Scarritt patent, applicant acknowledges the structure disclosed in FIGS. 7 and 8 therein, noting that the V-shaped configuration on opaque material poses two serious limitations to that invention, those being the V-shaped contour at 45 which is difficult to observe and sight through quickly and the larger amount of opaque material which further diminishes the effectiveness of its use. Lastly, applicant is aware of the invention disclosed in U.S. Pat. No. 2,584,777 to Adolfson which discloses a clearance indicating arm which is directed to an elongated bar which is, apparently, pivotally attached to the windshield by suction means and also including an interior eluminated electric light bulb for enhanced night viewing of the bar.

The present invention discloses an extremely simple, yet highly effective steering guide attachable to the inner surface of the windshield or the dash panel of a vehicle and which provides clear lateral positioning indicia of the vehicle for the operator without undue concentration or visual manipulation. By the placement of all or a substantial portion of the invention in close proximity to the inner surface of the windshield, the invention also minimizes, if not eliminates, all reflective glare between the windshield therewith so as to enhance its visual operation and accuracy at a glance by the operator. The present invention is provided in various forms which includes features of lateral and vertical adjustability, night viewability, economy and simplicity in its manufacture and deployment, and transparency of all components except for critical sighting portion of the sighting member.

BRIEF SUMMARY OF THE INVENTION

This invention is directed to a lane marker steering guide attachable in close proximity to the surface of the windshield of a vehicle or its dash panel including a single sight member connected to means for attaching the steering guide to the inner surface of the windshield or the dash panel. The upper portion of the sight member is arrow-shaped and upwardly pointing when installed and also has an opaque or translucent layer on the pointed upper portion of the otherwise transparent sight member. The attaching means is also preferably substantially transparent. Both sight member and attaching means have various embodiments, including lateral and vertical adjusting means for the sight member. However, an important feature of this invention resides in its close proximity, particularly the sight member, to the inner surface of the windshield to reduce reflective glare.

It is therefore an object of this invention to provide a lane marker steering guide for vehicles which is simple and economical to manufacture and easy to install on or in close proximity to the inner surface of a vehicle windshield.

It is another object of this invention to provide a lane marker steering guide for vehicles which is extremely accurate and simple in its use and functioning.

It is another object of this invention to provide a lane marker steering guide for vehicles which may be laterally and vertically adjustable to accommodate movement within the driver's seat and a variety of driver sizes and positioning.

It is another object of this invention to provide a lane marker steering guide for vehicles which is convenient to use during night driving.

It is another object of this invention to provide a lane marker steering guide for vehicles which minimizes, if not eliminates, reflective glare problems which reduce visual effectiveness.

It is another object of this invention to provide a lane marker steering guide for vehicles which is substantially transparent except for the critical portion of the sighting member.

In accordance with these and other objects which will become apparent hereinafter, the instant invention will now be described with reference to the accompanying drawings in which:

DETAILED DESCRIPTION OF THE INVENTION

Figure 1:
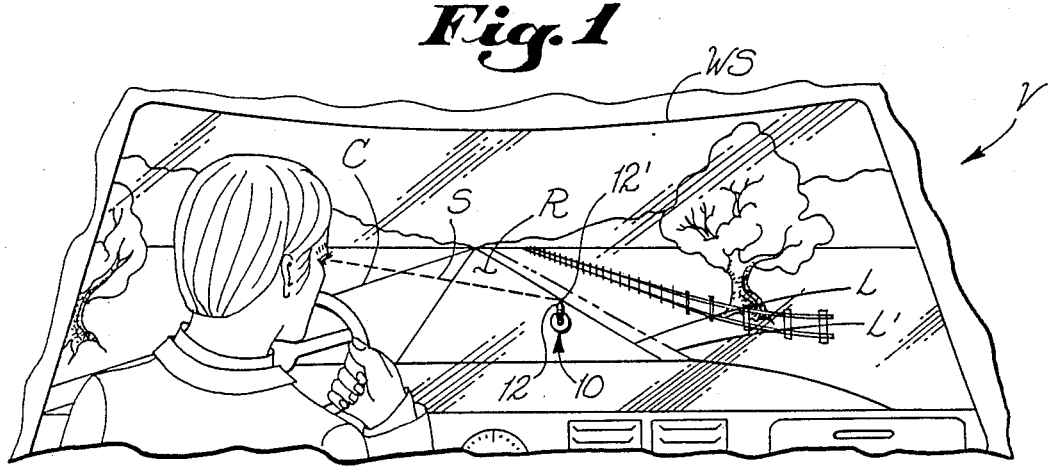
FIG. 1 is a perspective view through the windshield of a vehicle such as an automobile showing one embodiment of the invention in use in conjunction with a right-hand lane marker.
Figure 2:
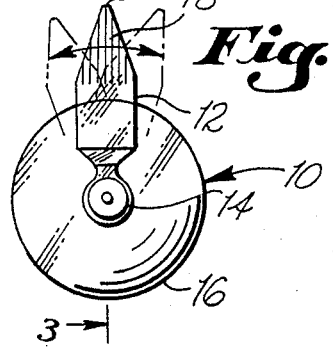
FIG. 2 is a front elevation view of the embodiment of the invention shown in FIG. 1.
Figure 3:
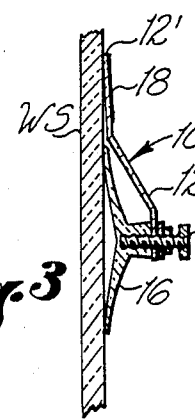
FIG. 3 is a section view in the direction of arrows 3—3 in FIG. 2.
Figure 6:
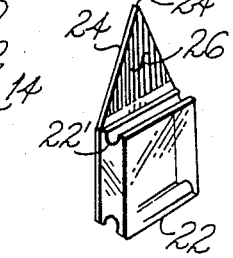
FIG. 6 is a perspective view of the slide and sight member of the embodiment shown in FIG. 4.

Referring now to the drawings, and particularly to FIGS. 1, 2 and 3, the preferred embodiment of the invention is shown generally at numeral 10 and includes a sight member 12 having generally, a pointed upper end and, preferably, an upwardly pointed arrow-shaped tip 12'. The sight member 12 is connectable to a suction cup 16 by threaded hand member 14. The upper arrow-shaped portion of sight member 12 is coated at 18 with either an opaque or translucent material. Otherwise, the suction cup and the lower portion of the sight member 12, including its connection to the suction cup 16 are transparent.

As best seen in FIG. 1, this embodiment 10 is attached to the inner surface of the vehicle's V windshield WS. In operation, the driver of the vehicle V sights along sightline S to the tip 12' of sight member 12, seeking to maintain the vehicle V laterally positioned along the roadway R such that the tip 12' coincides along sightline S with the lane marker L. The lane marker L is typically a painted stripe along both the outer edge and the median strip of the roadway R. When the vehicle V is in proper lateral positioning on the roadway R, the tip 12' will appear to touch the lane marker L. However, when the vehicle V is laterally positioned incorrectly on the roadway R, the tip 12' will not intersect the lane L along sightline S. In FIG. 1, the vehicle V is shown laterally displaced to the left in relation to phantom lane marker L' to demonstrate the effectiveness of the invention in its simplicity. Note, in that regard, that tip 12' and lane marker L' do not touch along sightline S.

Referring again to FIG. 2, the sight member 12, connected to the suction cup 16 by threaded hand fastener 14, permits the sight member 12 to be rotated in the direction of the arrows to effect slight lateral adjustment of the tip 12'. Note also that, as depicted in FIG. 3, the sight member 12, formed of a strip of relatively thin rigid material, has been contoured such that the upper arrow-shaped portion and opaque coating 18 are placed in very close proximity, if not against, the windshield WS. This structure relationship to the windshield WS enhances the effectiveness and accuracy of the invention by reducing, if not eliminating, reflections from the windshield WS.

Figure 7:
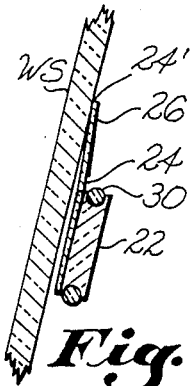
FIG. 7 is a section view in the direction of arrows 7—7 in FIG. 4.

Referring now to FIGS. 4, 5, 6 and 7, one adjustable embodiment of the invention is shown generally at numeral 20 and includes slide guide 30 in the form of a bow or oval-shaped member, connected at each end by threaded hand fasteners 32 to suction cups 28. Disposed within the slide guide 30 is slide 22 having grooves 22' disposed into its upper and lower margins shaped to fit within the bow 30 as best seen in FIG. 7. By this arrangement, the slide 22 may be easily laterally adjusted in the direction of the arrows by hand. Connected to the back side of the slide 22 is sight member 24, also arrow shaped in its upper portion and pointing upwardly toward tip 24'. In this embodiment 30, the upper portion of sight member 24 is coated with a luminiscent material at 26 to enhance visibility of the upper portion of sight member 24 during night driving. Here, again, as much of the structure as is practical is placed in very close proximity to the inner surface of the windshield WS to minimize reflective glare. Note that the slide 22 and sight member 24 are virtually against the inner surface of the windshield WS.

Figures 8, 9:
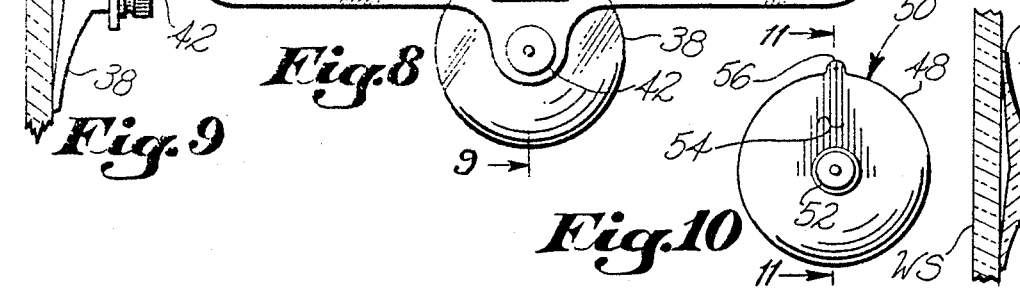
FIG. 8 is a front elevation view of another embodiment of the invention.
FIG. 9 is a section view in the direction of arrows 9—9 in FIG. 8.

Referring now to FIGS. 8 and 9, another adjustable embodiment of the invention is shown generally at numeral 40 and includes an oval shaped slide guide 36 connected at its mid point by threaded hand fastener 42 to suction cup 38. The structure of slide 22 is substantially similar to that depicted in the embodiment of FIG. 4. However, the sight member 44 has been elongated somewhat to position the upper arrow-shaped portion of sight member 44 above the suction cup 38. Here, again, as much of this embodiment 40 as is practical is placed, if not against, in very close proximity to the inner surface of the windshield WS. Further note that all of the structure, except for the coated upper portion 46 of sight member 44 is transparent to further enhance the distinctiveness of the coated arrow-shaped portion of sight member and the overall effectiveness of the invention. In this embodiment 40, the upper coated portion 46 is effected by an adhesive strip attached thereto.

Figures 10, 11:
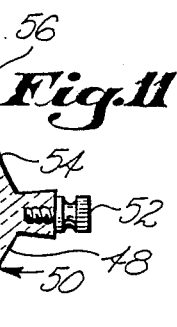
FIG. 10 is a front elevation view of another embodiment of the invention.
FIG. 11 is a section view in the direction of arrows 11—11 in FIG. 10.
Figure 13:
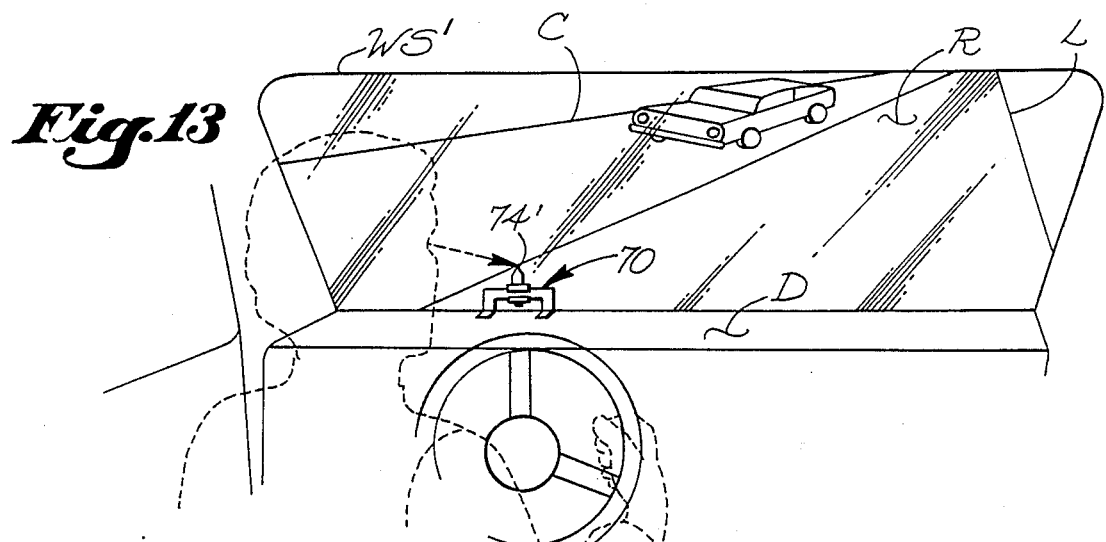
FIG. 13 is a perspective view through the windshield of a vehicle such as a motor home showing another embodiment of the invention in use in conjunction with the left hand or center lane marker.
Figure 14:
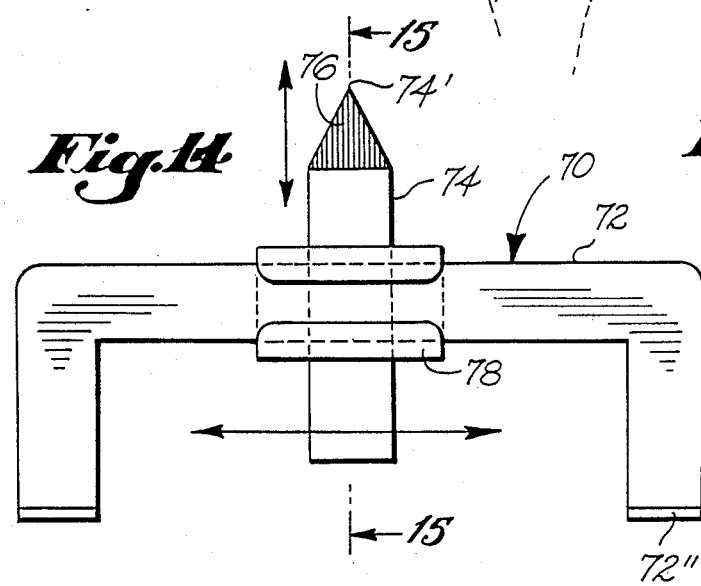
FIG. 14 is a front elevation view of the embodiment of the invention shown in FIG. 13.

Referring now to FIGS. 10 and 11, a simpler embodiment of the invention is shown generally at 50 and includes suction cup 48 with optional threaded hand fastener 52 disposed therein primarily for convenience in handling, installing and removing this embodiment 50. A layer of opaque coating 54 is disposed on the outer surface of the suction cup 48 in the shape of an upwardly pointing arrow wherein the release tab 56 molded into the perimeter of the suction cup 48 serves as the tip of this arrow shaped coating 54.

Figures 4, 12:
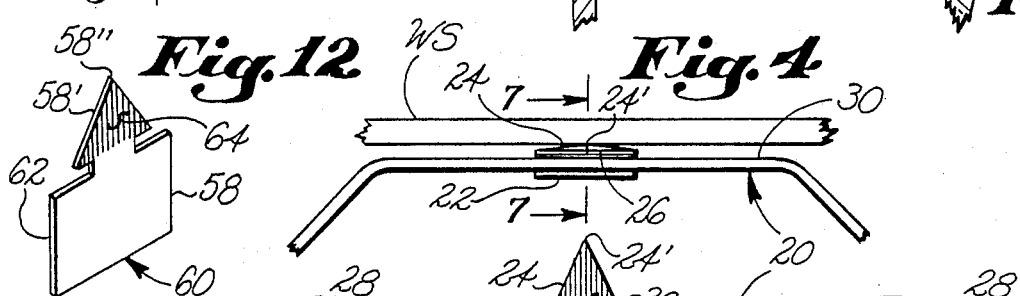
FIG. 4 is a partial top plan view of another embodiment of the invention.
FIG. 12 is a perspective view of another embodiment of the invention.
Figure 5:
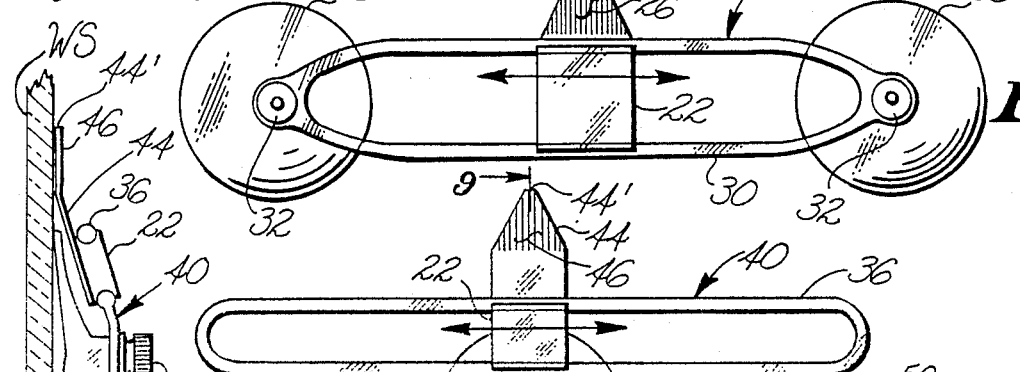
FIG. 5 is a front elevation view of FIG. 4.

Referring to FIG. 12, another economical embodiment of the invention is shown at 60 and includes a sheet of transparent material 58 having arrow-shaped sight portion 58' disposed from its upper margin pointing upwardly toward tip 58'. The transparent sheet 58 also includes a layer of adhesive 62 to facilitate attaching the entire sheet 58 to the inner surface of the windshield WS. The entire sheet 58 of sight member 60 is transparent, except for the sight portion 58' which is coated at 64 with a translucent material to highlight the sight portion 58' during momentary use typical of many driving situations wherein the driver must have a very ready lane positioning reference. It should be noted that, within the scope of this embodiment shown in FIG. 12, even the transparent portion of sheet 58 may be eliminated whereby this embodiment of the invention is reduced to only the arrow-shaped tip 58'. The additional transparent material of sheet 58 is provided to facilitate its adhesive application onto the inner surface of the windshield.

It should be noted that, in FIG. 1, the invention 10 is described and disposed with respect to the right hand lane marker L. However, applicant has found it preferable to use the invention in conjunction with the left hand or center lane marker C as substantially less of the front of the vehicle V interferes with the overall viewing of the invention whose use is also regularly facilitated in conjunction with the driver's glances at the left hand rear view mirror. It is further preferred that the invention be positioned such that the sight line S intersects the tip of the invention and the center lane C as close to the front of the vehicle as practical. This positioning is important where other vehicles are also moving in the lane in front of the vehicle V whereby both the center lane marker C and the right hand lane marker L are obscured from view. In installing the invention onto the inner surface of the windshield WS, it is recommended that this be done with the vehicle V stationary and a predetermined distance from the appropriate lane marker L or C such that, when the driver is comfortably positioned, the sight line S over the tip of the invention properly reflects that chosen vehicle positioning.

Referring lastly to FIGS. 13 through 17, an embodiment of the invention shown generally at numeral 70 is provided which embodies the above feature, used in conjunction with the left hand or center lane marker C. The view as seen through the windshield WS' is typical of a motor home V' which does not have a hood extending forwardly of the windshield. Such structure in this type of vehicle, V' facilitates placing the embodiment in close proximity to the dash panel D. Again, in the arrangement shown in FIG. 13, this embodiment 70 is disposed leftwardly for use in conjunction with the left hand or center lane marker C. Applicant prefers this arrangement of left handed use because positioning with respect to the left hand or center lane marker C is more critical.

Figure 15:
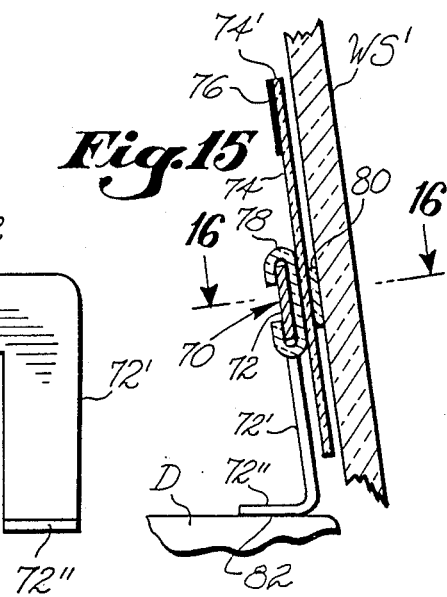
FIG. 15 is a section view in the direction of arrows 15—15 in FIG. 14.
Figure 17:
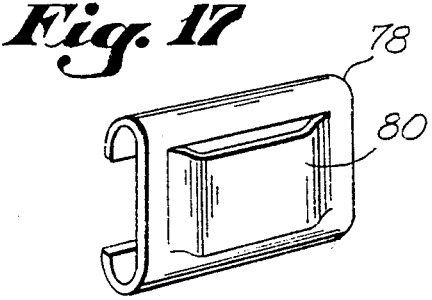
FIG. 17 is a perspective view of the multi-direction slide of the embodiment of the invention shown in FIG. 13.

This embodiment 70 includes a generally inverted U-shaped frame 72 formed of thin, relatively rigid sheet material and having mountings tangs 72' disposed from the lower distal ends as shown. As best seen in FIG. 15, these mounting tangs 72' are adapted to be either adhesively adhered along 82 to dash panel D or otherwise fastened mechanically thereto in the position shown.

Figure 16:
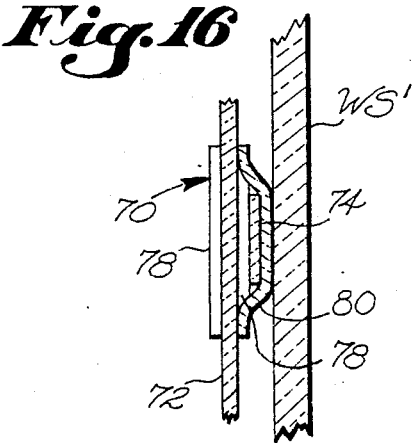
FIG. 16 is a section view in the direction of arrows 16—16 in FIG. 15.

Sight member 74, having an arrow-shaped upwardly end forming tip 74' is held in position in relation to frame member 72 by multidirection slide 78. Slide 78 is generally "C"-shaped in section as best seen in FIG. 15 to surround and slideably engage over the horizontal portion of frame 72, thus providing a lateral adjustability in the direction of the horizontal arrow in FIG. 14. Attached to the back of slide 78 is bracket 80, also C-shaped in section as best seen in FIG. 16 which surrounds and slideably supports sight member 74, thus providing vertical adjustability of sight member 74 in the direction of the vertical arrow in FIG. 14.

The upper end 76 of sight member 74 is coated with a luminescent covering for enhanced night vision.

As previously described, the tip 74' of sight member 74, when coincident with center lane marker C as viewed by the operator of the vehicle V', provides the visual indicia which assures the driver that the vehicle V' is in proper lateral positioning on the roadway R. It is here presumed that the driver has previously laterally and vertically adjusted the tip 74' such that, when tip 74' is coincident with his line of sight and the center lane marker C', the vehicle V' is in the preselected lateral position with respect to the center lane marker C.

As in previous embodiments, this embodiment 70' is constructed primarily of transparent sheet material to maximize the distinctiveness of the luminescent upper end coating 76 of the sight member 74, which sight member 74 is positioned in close proximity to the inner surface of the windshield WS' to again minimize reflective glare.

Although the preferred embodiment of the sight members as separate elements of the various embodiments of the invention are preferred to be fabricated of relatively thin rigid material, transparent except for the opaque tip portion, it should be noted that an alternate embodiment of the sight member (not shown) may be fabricated of relatively thin flexible sheet material such as plastic. This alternate embodiment will allow the sight member to be spring biased against the inner surface of the windshield, even in its adjustable forms. By this construction, virtually all glare is eliminated and, additionally manufacturing tolerances which would otherwise vary the spacing between the sight member and the windshield will be eliminated. Thus, the important upper portion of the sight member with its opaque arrow-shaped tip pressing directly against the windshield still further enhances the visual distinctiveness of the invention.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. A lane marker steering guide releasably connectable to the inner surface of a windshield comprising:
   a suction cup having a base with an inner surface attachable to the inside of the vehicle windshield;
   said suction cup having an outer surface including a central raised portion laterally extending from said base;
   an elongated sight member formed of flat, relatively thin, flexible material and having a proximal end, a distal end, and a mid-portion therebetween;
   said sight member pivotally connected by a threaded fastener at said proximal end to said suction cup raised portion by threadable engagement of said threaded fastener into an aperture in said suction cup raised portion;
   said sight member distal end arrow-shaped and terminating at a point in very close proximity radially outwardly from said base;
   said sight member having a first and second transverse bend, said first transverse bend dividing said proximal end and said mid-portion, said second transverse bend dividing said distal end and said mid-portion;
   said first bend positioned adjacent and in close proximity to said suction cup raised portion and disposing said mid-portion toward the windshield inner surface and said base outer edge margin;
   said second bend positioned adjacent and in close proximity to said base outer edge margin and disposing and biasing said distal end generally parallel to and against the inner surface of the windshield;

said distal end opaque, the remainder of said sight member transparent;

said pivotal connection proximal end between said sight member and said suction cup raised portion frictionally adjustable by tightening and loosening said threaded fastener.

2. A lane marker steering guide as set forth in claim 1, wherein:

said distal end is also luminescent.

* * * * *